United States Patent
Zaslavsky et al.

(10) Patent No.: US 11,283,841 B2
(45) Date of Patent: Mar. 22, 2022

(54) COMMUNITY-BASED ANOMALY DETECTION POLICY SHARING AMONG ORGANIZATIONS

(71) Applicant: EMC IP Holding Company LLC, Hopkinton, MA (US)

(72) Inventors: Alex Zaslavsky, Brookline, MA (US); Salah E. Machani, Medford, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 461 days.

(21) Appl. No.: 16/257,351

(22) Filed: Jan. 25, 2019

(65) Prior Publication Data
US 2020/0244705 A1 Jul. 30, 2020

(51) Int. Cl.
| | |
|---|---|
| H04L 29/06 | (2006.01) |
| H04L 12/24 | (2006.01) |
| H04L 41/0893 | (2022.01) |
| H04L 41/14 | (2022.01) |

(52) U.S. Cl.
CPC ........ H04L 63/205 (2013.01); H04L 41/0893 (2013.01); H04L 41/145 (2013.01)

(58) Field of Classification Search
CPC . H04L 63/205; H04L 41/0893; H04L 41/145; G06Q 10/0639
See application file for complete search history.

(56) References Cited

U.S. PATENT DOCUMENTS

| | | | |
|---|---|---|---|
| 6,785,706 B1* | 8/2004 | Horman | H04L 41/0843 709/203 |
| 8,768,892 B2* | 7/2014 | Myerson | G06N 5/04 707/686 |
| 9,009,827 B1* | 4/2015 | Albertson | G06F 21/55 726/22 |
| 9,215,142 B1* | 12/2015 | Herold | H04L 43/0817 |
| 9,253,204 B2* | 2/2016 | Bradley | H04L 63/1416 |
| 9,292,881 B2* | 3/2016 | Alperovitch | G06Q 50/01 |

(Continued)

OTHER PUBLICATIONS

Tony Rutkowski, Collaboration in the Work on Global Cybersecurity, Telecommunication Standardization Sector, Feb. 2009.

(Continued)

*Primary Examiner* — Patrice L Winder
(74) *Attorney, Agent, or Firm* — Ryan, Mason & Lewis, LLP

(57) ABSTRACT

Techniques are provided for community-based anomaly detection policy sharing among organizations. One method comprises obtaining a cluster of organizations derived from clustering multiple organizations based on predefined clustering parameters; obtaining multiple policies from the organizations in the cluster; selecting one of the obtained plurality of policies based on a predefined policy sharing criteria; and sharing the selected policy with one or more of the organizations in the cluster. A use of the selected policy by one or more of the organizations may be simulated to evaluate a performance of the selected policy. The selected policy may be normalized and/or abstracted prior to being shared with organizations in the cluster. A given policy obtained from the organizations in the cluster may be weighted based on an influence rating of one or more source organizations that provided the given policy.

20 Claims, 12 Drawing Sheets

(56) References Cited

U.S. PATENT DOCUMENTS

| | | | | |
|---|---|---|---|---|
| 9,348,735 | B1* | 5/2016 | Cohen | G06F 11/34 |
| 9,710,644 | B2* | 7/2017 | Reybok | G06F 21/552 |
| 9,787,719 | B2* | 10/2017 | Efstathopoulos | H04L 63/20 |
| 10,142,204 | B2* | 11/2018 | Nickolov | H04L 43/0817 |
| 10,372,768 | B1* | 8/2019 | Lewis | G06F 16/48 |
| 10,587,643 | B2* | 3/2020 | Bulut | H04L 63/1441 |
| 10,601,857 | B2* | 3/2020 | Bulut | H04L 63/1433 |
| 10,649,752 | B2* | 5/2020 | Cook | H04L 67/34 |
| 10,812,508 | B2* | 10/2020 | Hailpern | H04L 63/1425 |
| 2015/0373040 | A1* | 12/2015 | Sander | H04L 63/1425 726/22 |
| 2016/0063379 | A1* | 3/2016 | Adderly | G06N 5/04 706/11 |
| 2016/0307286 | A1* | 10/2016 | Miasnik | G06Q 50/265 |
| 2017/0083643 | A1* | 3/2017 | Seigel | G06F 9/45533 |
| 2017/0155683 | A1* | 6/2017 | Singla | H04L 63/1408 |
| 2018/0091542 | A1* | 3/2018 | Bachner | H04L 63/1433 |
| 2019/0347148 | A1* | 11/2019 | Gomes Pereira | G06F 11/079 |

OTHER PUBLICATIONS

Network and Security Manager, Configuring Intrusion Detection and Prevention Devices Guide, Juniper Networks, Release Feb. 2012, Jan. 2013.

User Guide for Cisco Security Manager 4.7, Managing Policies [Cisco Security Manager]—Cisco, Apr. 25, 2017.

* cited by examiner

| Rule ID | Rule Name | Creation Date | Update Date | Comb. Type | Cond | Sensor | Operator | Value | Action |
|---|---|---|---|---|---|---|---|---|---|
| 381898 | VPN MFA | 20180817 | 20180902 | NEG. | And | memberOf | SET_CONTAINS_ANY | myOrgGroup List | AUTH. |
| 381898 | VPN MFA | 20180817 | 20180902 | NEG. | And | IPAddress | = | 10.11.12.13 | AUTH. |

FIG. 6 — 600

| Rule ID | Rule Name | Creation Date | Update Date | Comb. Type | Cond | Sensor | Operator | Value | Action |
|---|---|---|---|---|---|---|---|---|---|
| 381898 | VPN MFA | 20180817 | 20180902 | NEG. | And | Active Directory User Spec. | SET_CONTAINS_ANY | Generic User List | AUTH. |
| 381898 | VPN MFA | 20180817 | 20180902 | NEG. | And | Internal IP | = | Internal IP | AUTH. |

1. For Each Organization c Normalize Each Policy $P_i^c$ According to Following Steps:
2. Represent Policy as List of Sensors $S_{P_i}^c$, Operators $O_{P_i}^c$, and Values $V_{P_i}^c$ (Depending on Type of Sensor, Values can be Different for Different Organizations)
3. Abstract Values in $V$ and $S$ to Highest Level of Abstraction ($AV_{P_i}^c$ and $AS_{P_i}^c$: Multiple Values Accessible). Because Sensors and Operators can be Same Across Multiple Organizations, but Value Will Differ.
4. Based on Example of FIG. 6, Perform Following Abstractions:
   memberOf to - "Active Directory User Specification"
   myorgList to - "Generic List of Users"
   IP Address to - "Internal IP" (With Additional Data Analysis, could also say "Most Common Internal IP in Headquarters")
5. Replace $V_{P_i}^c$ with $AV_{P_i}^c$ in Policy Representation

FIG. 7

| Sensor | Questions | Abstraction(s) |
|---|---|---|
| IP Address | Does IP Address Represent Internal Network? | Internal IP |
|  | Is IP Address in IP Range of Organization? | External IP |
| Location/Location List | Is this Office Location? | Office |
|  | Is this a Country of Operations of Organization? | Country of Operation |
| User Agent/User Agent list | What Type of OS? | Linux |
| User Logon Name, Mail, Virtual Groups | What is Most Common Attribute in Active Directory for These Users? | Active Directory User Specification |

FIG. 9

1. Count Number of Organizations Using Same Policy Values and Sensors ($AV_{P_i}^c$ and $AS_{P_i}^c$) and Divide Number with Total Number of Organizations in Cluster.
2. Highlight Policies Being Shared With More Than 15% of Organizations (or if Number of organizations in Cluster is Lower Than 10, Then Highlight Policy Used by More Than 2 Organizations) - $AV_{P_i}^{cluster_j}$ and $AS_{P_i}^{cluster_j}$. Thresholds are Optionally Configurable.
3. Use Above Percentage as Indicator of Importance. If There are Multiple Policies that Passed Threshold, Rank Policies Based on Indicator of Importance.
4. Normalize Directionality of Policy by Analyzing Combination Type and Action.
5. Represent Example Policies of FIGS. 6 and 8, as follows:
   Authenticate - List All Users and IP addresses Allowed to Access. Specify NEGATIVE Combination Type and Set Action to AUTHENTICATE
   Allow - List All Users and IP addresses Allowed to Access, Set Action to ALLOW and Create Another Policy (with Lower Priority) That Authenticates Rest of Users
6. Suggest Most Common Directionality With Selected Values and Sensors. Provide Organization With Reasoning that Helps to Understand Why Policy was Chosen.

FIG. 10

1. Reverse Abstracted Values and Sensors to Actual Organization Values (Except Those Containing List of Active Directory Attributes):

$$AV_{P_i}^{cluster_j} \to V_{P_i}^{customer_{ji}} \text{ and } AS_{P_i}^{cluster_j} \to S_{P_i}^{customer_{ji}}$$

2. Apply Policy on Organization Data and Estimate Number of Authentication/False Positives That Policy will Trigger (e.g., an Approximation of Worst Case Performance Since Organizations can Fine Tune Policy for Own Needs).

FIG. 11

COMMUNITY-BASED ANOMALY DETECTION POLICY SHARING AMONG ORGANIZATIONS

FIELD

The field relates generally to information processing systems, and more particularly to techniques for anomaly detection.

BACKGROUND

Anomaly detection systems detect anomalous activity within an organization, often using machine learning techniques. A transaction may be classified as a suspicious transaction, for example, by one or more anomaly detection systems. In many organizations, policy mechanisms are often employed within their respective anomaly detection systems, where the policy mechanisms are often based on expert knowledge and best practices within the respective organizations.

A need exists for improved techniques for generating policies for anomaly detection.

SUMMARY

In one embodiment, a method comprises obtaining at least one cluster of organizations derived from clustering a plurality of organizations based on one or more predefined clustering parameters; obtaining a plurality of policies from at least one of the plurality of organizations in the at least one cluster; selecting at least one of the obtained plurality of policies based on a predefined policy sharing criteria; and sharing the at least one selected policy with one or more of the plurality of organizations in the at least one cluster.

In some embodiments, a use of the at least one selected by one or more of the plurality of organizations is simulated to evaluate a performance of the at least one selected policy. The at least one selected policy is optionally normalized and/or abstracted prior to being shared with organizations in the at least one cluster.

In at least one embodiment, the at least one selected policy is ranked based on an indicator of importance. A given policy obtained from the organizations in the cluster is optionally weighted based on an influence rating of one or more source organizations that provided the given policy.

Other illustrative embodiments include, without limitation, apparatus, systems, methods and computer program products comprising processor-readable storage media.

BRIEF DESCRIPTION OF THE DRAWINGS

FIG. 6 is a sample table comprising example policies generated in accordance with some embodiments of the disclosure;

FIG. 7 illustrates exemplary pseudo code for a policy normalization process, according to one embodiment of the disclosure;

FIG. 8 is a sample table comprising an abstraction of the example policies of FIG. 6, using the policy normalization process of FIG. 7, according to an embodiment;

FIG. 9 is a sample table comprising an exemplary set of abstractions that can optionally be applied prior to the policy sharing stage of FIG. 1, according to one or more embodiments of the disclosure;

FIG. 10 illustrates exemplary pseudo code for a policy sharing process, according to one embodiment of the disclosure;

FIG. 11 illustrates exemplary pseudo code for a policy validation process, according to one embodiment of the disclosure;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for community-based anomaly detection policy sharing among organizations.

In one or more embodiments, the disclosed community-based anomaly detection policy sharing techniques allow organizations to obtain one or more anomaly detection policies that have worked successfully for other similar organizations, for example, as part of an initial set up of an anomaly detection system. In addition, the disclosed community-based anomaly detection policy sharing techniques allow organizations to benefit from the experience of other organizations with respect to new anomaly threats and to leverage new and/or modified policies deployed by similar organizations (for example, that may include new configurations, protocols and/or authentication methods).

Figure 1:
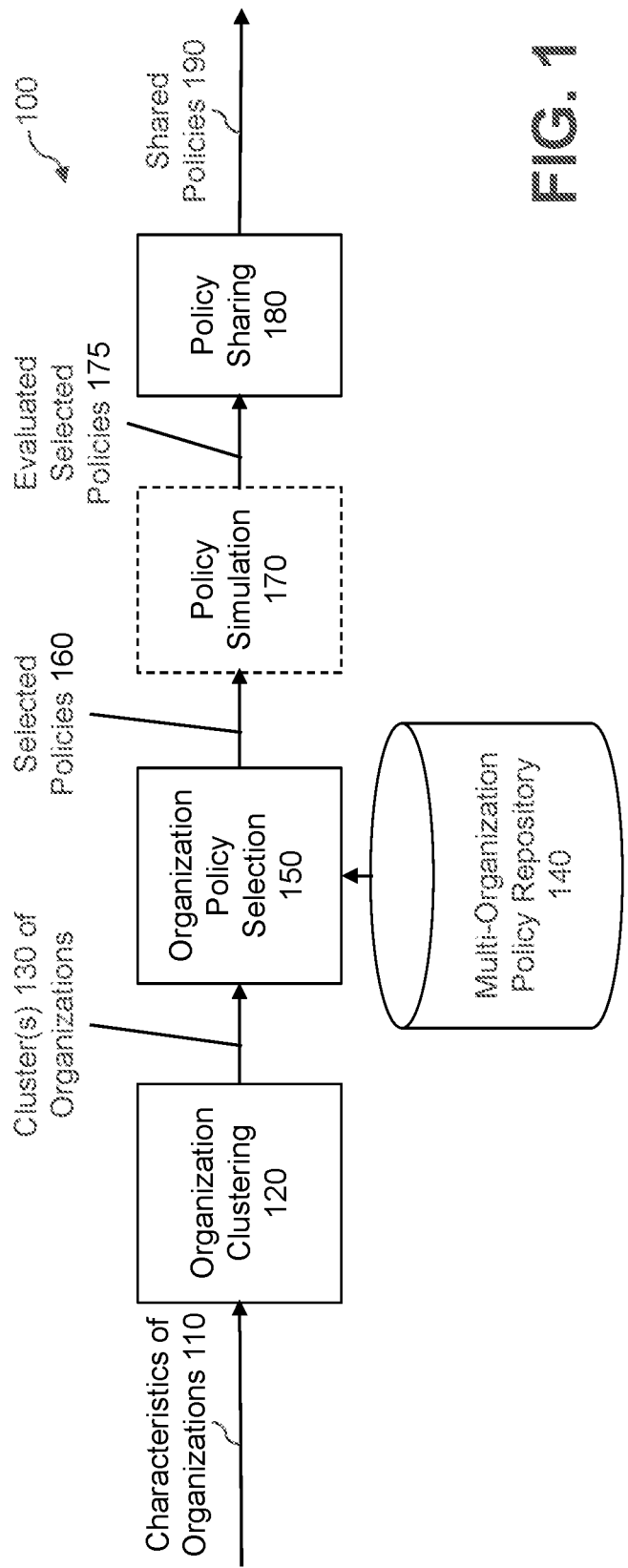
FIG. 1 illustrates an exemplary implementation of a community-based policy sharing system, according to one embodiment of the disclosure.

FIG. 1 illustrates an exemplary implementation of a community-based policy sharing system 100, according to one embodiment of the disclosure. As shown in FIG. 1, the exemplary community-based policy sharing system 100 processes characteristics of organizations 110 and a multi-organization policy repository 140, and generates one or more shared policies 190 that are shared to one or more organizations in a given cluster. In some embodiments, the exemplary community-based policy sharing system 100 comprises an organization clustering stage 120, an organization policy selection stage 150, an optional policy simulation stage 170 and a policy sharing stage 180.

As shown in FIG. 1, the exemplary organization clustering stage 120 processes the characteristics of organizations 110 to generate one or more clusters of organizations 130, as discussed further below in conjunction with FIG. 3. The exemplary organization policy selection stage 150 processes the multi-organization policy repository 140, as well as the generated clusters of organizations 130, to generate one or more selected policies 160, as discussed further below in conjunction with FIG. 4.

The exemplary policy simulation stage 170 optionally processes the generated selected policies 160 to generate one or more evaluated selected policies 175, as discussed further below in conjunction with FIGS. 5 and 11. The evaluated selected policies 175 are processed by the policy sharing stage 180 to provide one or more shared policies 190 to organizations in a given cluster, as discussed further below in conjunction with FIG. 10.

Figure 2:
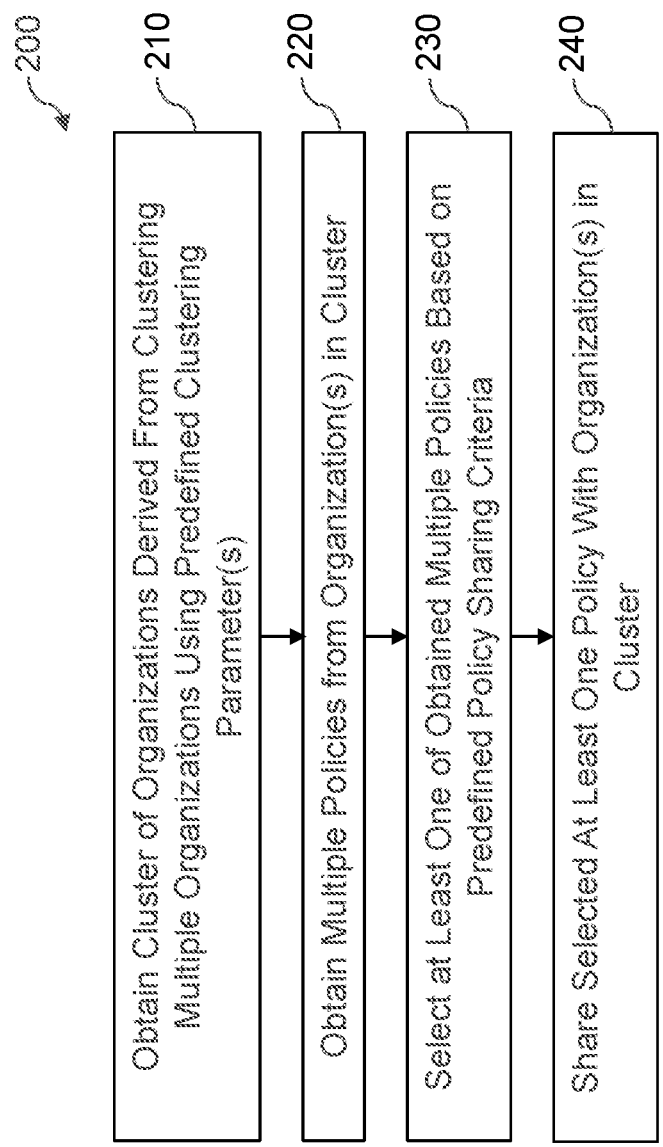
FIG. 2 is a flow chart illustrating a community-based policy sharing process, according to some embodiments.

FIG. 2 is a flow chart illustrating a community-based policy sharing process 200, according to some embodiments. As shown in FIG. 2, the exemplary community-based policy sharing process 200 initially obtains a cluster of organizations derived from clustering multiple organizations using one or more predefined clustering parameters during step 210. During step 220, the exemplary community-based policy sharing process 200 obtains multiple policies from one or more organizations in the cluster.

One or more of the obtained policies are selected during step 230, for example, based on a predefined policy sharing criteria. Finally, during step 240, the exemplary community-based policy sharing process 200 shares the selected policy or policies with one or more organizations in the cluster.

Figure 3:
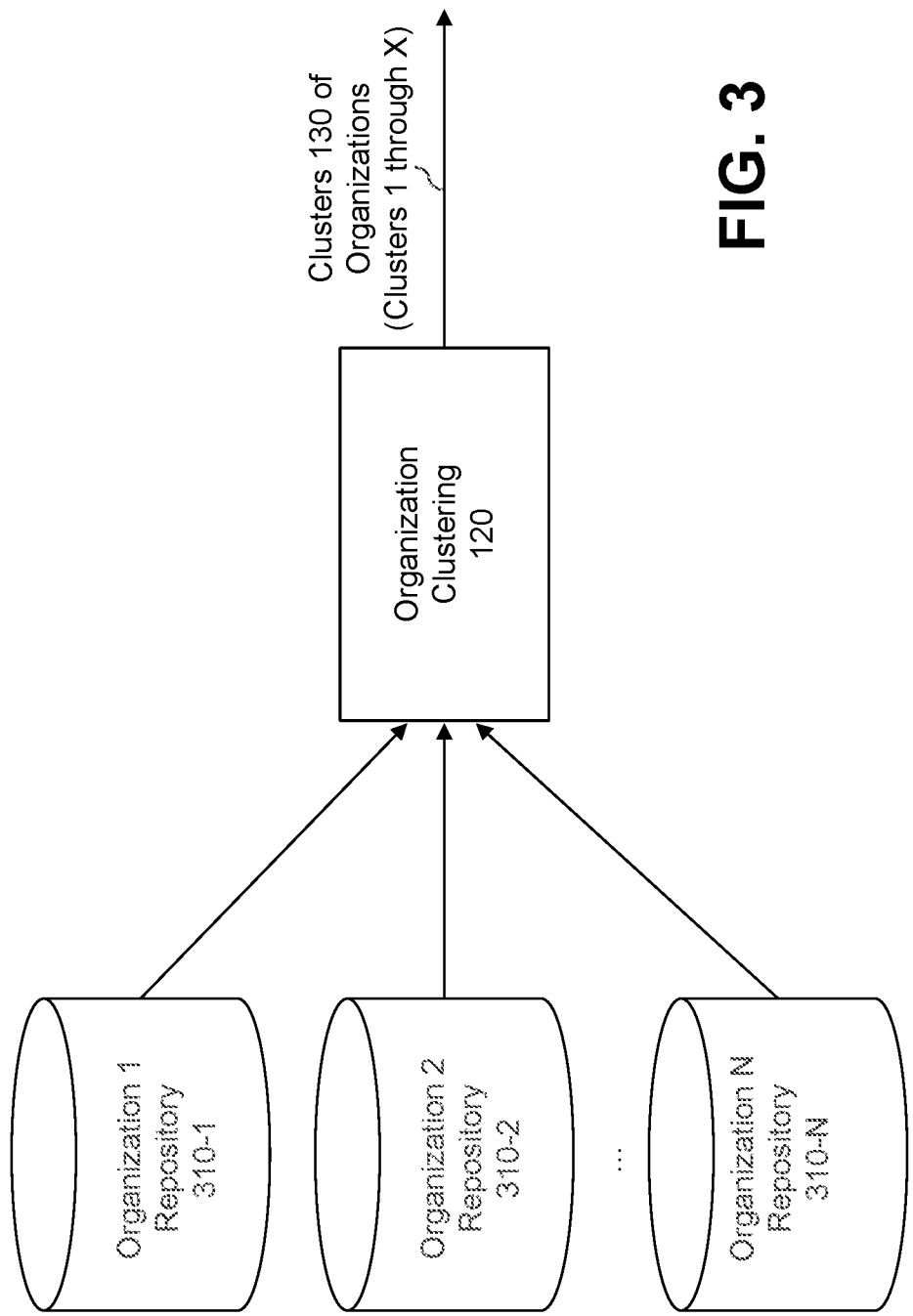
FIG. 3 illustrates the organization clustering stage of FIG. 1 in further detail, according to some embodiments of the disclosure.

FIG. 3 illustrates the organization clustering stage 120 of FIG. 1 in further detail, according to some embodiments of the disclosure. As shown in FIG. 3, the exemplary organization clustering stage 120 processes multiple organization repositories 310-1 through 310-N for multiple corresponding organizations 1 through N, respectively, and generates the clusters of organizations 130 (e.g., clusters 1 through X), where each cluster comprises one or more organizations.

Generally, a clustering algorithm will cluster organizations 1 through N into groups based on various parameters, such as of an industry type, a number of users, a number of locations, a number of protected applications, an application type, a customer characterization and/or an overall security score. One exemplary clustering algorithm implements a density-based spatial clustering of applications with noise (DBSCAN) for the clustering. The goal of the clustering steps is to increase a likelihood of a community-based policy to meet the business needs of a particular organization by comparing the organization to a group of similar organizations in the same industry. It is noted that all organizations (e.g., customers) can be a single cluster.

Figure 4:
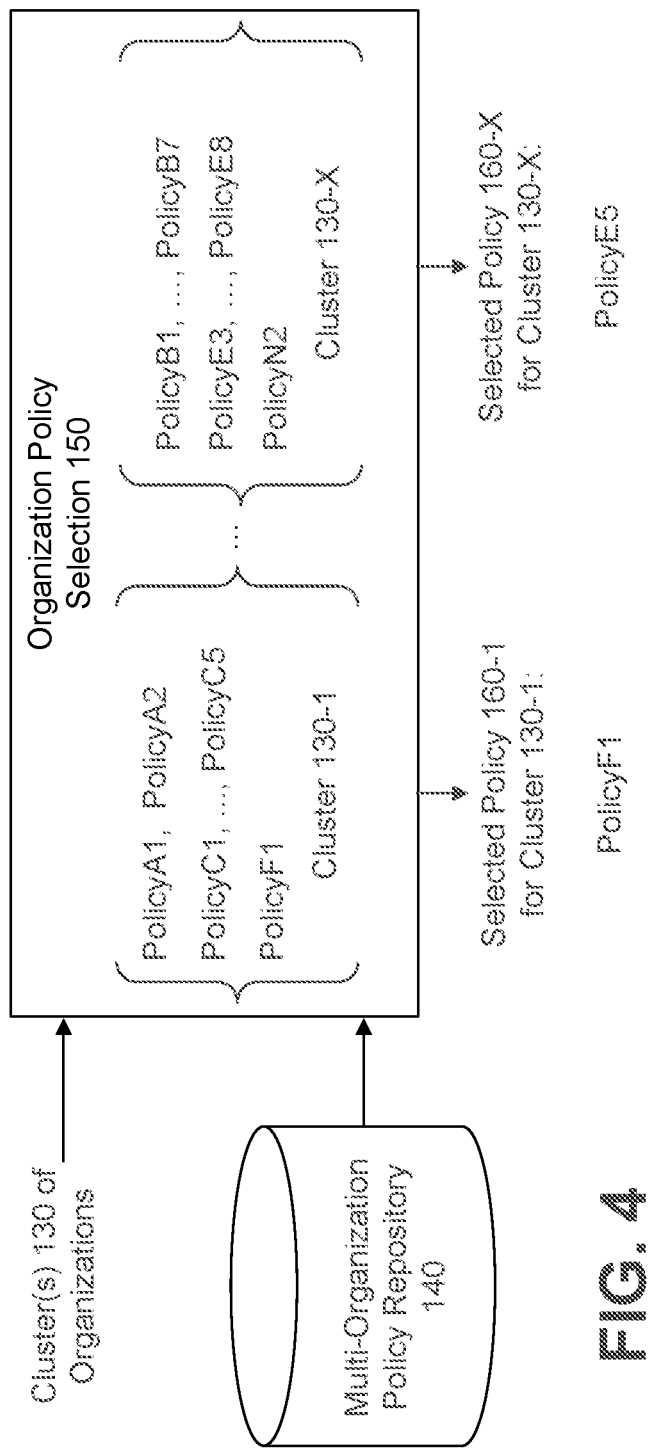
FIG. 4 illustrates the organization policy selection stage of FIG. 1 in further detail, according to one embodiment.

FIG. 4 illustrates the organization policy selection stage 150 of FIG. 1 in further detail, according to one embodiment. Generally, the organization policy selection stage 150 comprises an algorithm that will choose the most relevant policy schema for sharing. The goal of organization policy selection stage 150 is to choose the policy or set of policies that seems to be shared among multiple organizations.

As shown in FIG. 4, the exemplary organization policy selection stage 150 processes the clusters of organizations 130, as well as the multi-organization policy repository 140, indicating the policies of each cluster 130-1 through 130-X. For example, the cluster 130-1 comprises a set of policies A1 and A2 for Organization A, C1 through C5 for Organization C, and policy F1 for Organization F.

The exemplary organization policy selection stage 150 selects at least one policy to share based a predefined policy sharing criteria. As shown in FIG. 4, the organization policy selection stage 150 selects policy F1 as the selected policy 160-1 for cluster 130-1, and selects policy E5 as the selected policy 160-X for cluster 130-X.

Figure 5:
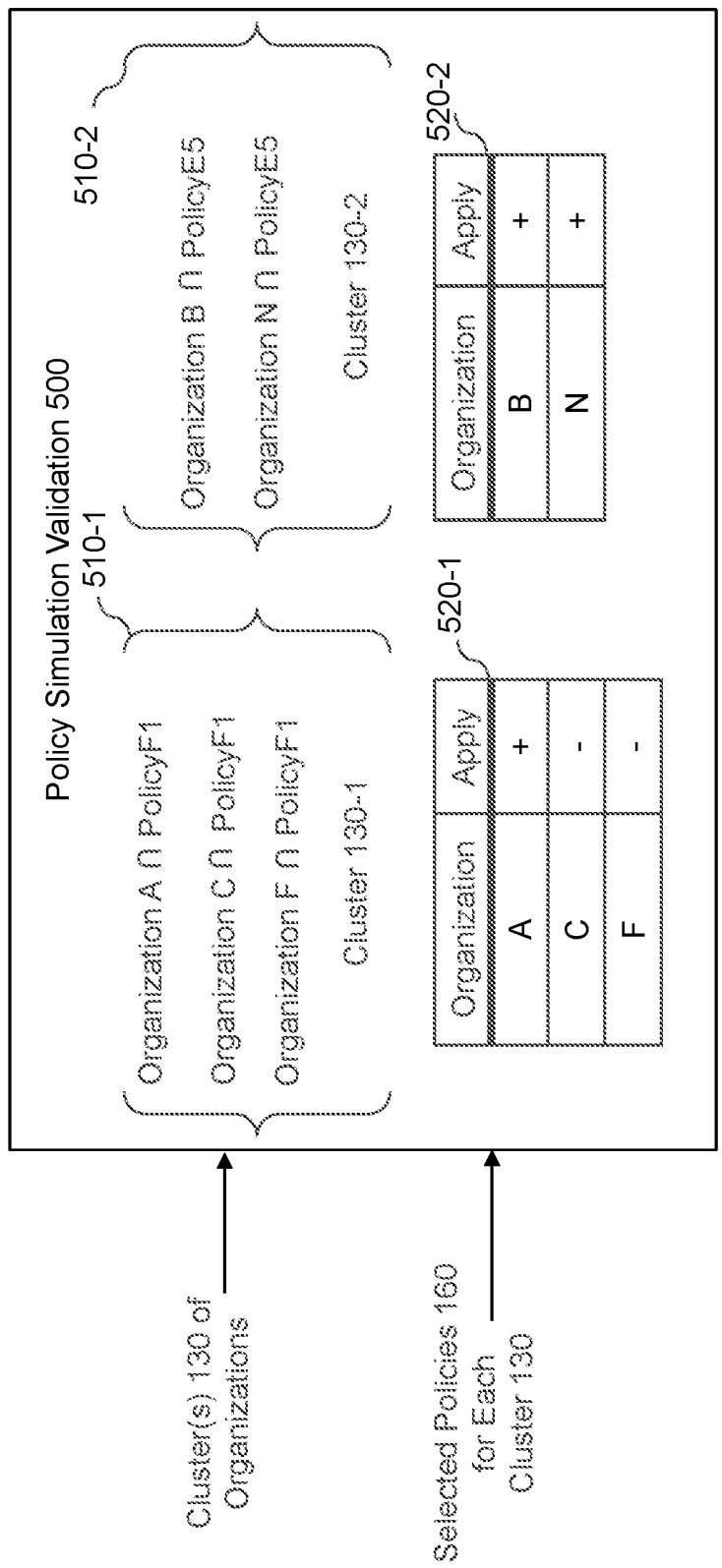
FIG. 5 illustrates a validation of simulation results generated by the policy simulation stage of FIG. 1, according to one embodiment.

FIG. 5 illustrates a validation 500 of the simulation results generated by the policy simulation stage 170 of FIG. 1, according to one embodiment. Generally, in some embodiments, a simulator is provided to apply the selected policy 160-$i$ on each of the organizations in the cluster 130-$i$ (e.g., those organizations in the cluster 130-$i$ that did not previously deploy the selected policy 160-$i$) to evaluate the performance of the selected policy 160-$i$.

As shown in FIG. 5, the exemplary policy simulation validation module 500 processes the clusters of organizations 130 and the selected policies 160. The policy simulation validation module 500 updates the policies 510-1 and 510-2 for the organizations A, C, F and B, N, respectively, in representative clusters 130-1 and 130-2 by adding the selected policy 160-$i$ for each of the organizations in the respective cluster 130-$i$, for example, to those organizations in the cluster 130-$i$ that did not previously deploy the selected policy 160-$i$.

The exemplary policy simulation validation module 500 employs the policy validation process of FIG. 11, discussed below, to determine whether to apply a given selected policy 160-$i$ to each organization in the cluster 130-$i$ that did not previously deploy the selected policy 160-$i$. and records the result in a corresponding selective policy deployment table 520-$i$. For example, for cluster 130-1, the exemplary policy simulation validation module 500 determines that the selected policy 160-1 should be applied to organization A, but not to organizations C and F in cluster 130-1. Likewise, for cluster 130-2, the exemplary policy simulation validation module 500 determines that the selected policy 160-2 should be applied to organizations B and N in cluster 130-1.

FIG. 6 is a sample table 600 comprising example policies generated in accordance with some embodiments of the disclosure. As shown in FIG. 6, for each exemplary policy in the table 600, a rule identifier, creation date, update date, combination type, condition, sensor, operator, value and action are provided. For example, the two example policies specify the exact group of users (myOrgGroupList) and IP address (10.11.12.13) that can access the system and authenticates all other users.

Generally, the sensor specifies the data fact from an authentication event that policy logic is applied on. For example, a sensor can be an IP address or a location. A given exemplary sensor can specify "if CURRENT_ACTIVITY_IPADDRESS" ("Sensor" field) is equal to a "value" of "1.2.3.4" then "ALLOW" ("Action" field) the access. Likewise, for a specified combination type, the field might be either POSITIVE or NEGATIVE. In some situations, it helps to specify NOT on a policy. In the example of FIG. 6, the policy will be the following—if the user is not in the myOrgGroupList ("value" field) and the IP address is not equal to "10.11.12.13," then authenticate.

FIG. 7 illustrates exemplary pseudo code 700 for a policy normalization process, according to one embodiment of the disclosure. As shown in FIG. 7, the exemplary policy normalization process initially represents a policy as a list of the Sensors $S_{P_i}^c$, the operators $O_{P_i}^c$ and the values $V_{P_i}^c$ (depending on the type of sensor, the values can be different for different organizations). Thereafter, in some embodiments, the values in V and S are abstracted to, for example, a highest level of abstractions ($AV_{P_i}^c$ and $AS_{P_i}^c$; multiple values accessible). It is noted that sensors and operators can be the same across multiple customers, but values can differ. Based on the example policies of FIG. 6, the following abstractions are then performed:

Abstract memberOf to—"Active Directory user specification";

Abstract myorgList to—"generic list of users"; and

Abstract IP address to—"internal IP" (with additional data analysis, an abstraction of "most common internal IP in the headquarters" can also be employed).

Finally, the exemplary policy normalization process replaces the $V_{P_i}^c$ with the $AV_{P_i}^c$ in the policy representation.

In this manner, policy comparison across organization can be performed, as well as future aggregations.

FIG. 8 is a sample table 800 comprising an abstraction of the example policies of FIG. 6, using the policy normalization process of FIG. 7, according to an embodiment of the disclosure. As shown in FIG. 8, the memberOf value of FIG. 6 has been abstracted to "Active Directory user specification" in FIG. 8; the myorgList value of FIG. 6 has been abstracted to a "generic list of users" in FIG. 8; and the IP address value (10.11.12.13) of FIG. 6 has been abstracted to "internal IP" in FIG. 8.

FIG. 9 is a sample table 900 comprising an exemplary set of abstractions that can optionally be applied prior to the policy sharing stage 180 of FIG. 1, according to one or more embodiments of the disclosure. As shown in FIG. 9, for a sensor value of "IP Address," questions of "does the IP address represent an internal network?," and "is the IP address in IP range of the organization?," can be abstracted to "Internal IP," and "External IP," respectively.

In addition, for an exemplary sensor value of "location/location list," questions of "is this the office location?," and "is this the country of operations of the organization?," can be abstracted to "Office," and "Country of operation," respectively. Further, for a sensor value of "user agent/user agent list," questions of "what type of OS?," can be abstracted to "Linux." Finally, for an exemplary sensor value of "user logon name, mail, virtual groups," questions of "what is the most common attribute in Active Directory for these users? (e.g., title, department, etc.)," can be abstracted to "Active Directory user specification."

FIG. 10 illustrates exemplary pseudo code 1000 for a policy sharing process, according to one embodiment of the disclosure. As shown in FIG. 10, the exemplary policy sharing process initially counts the number of organizations that use the same policy values and sensors ($AV_{P_i}^c$ and $AS_{P_i}^c$) and divide the number with the total number of organizations in the cluster. Thereafter, policies are highlighted that are being shared with more than 15% of the organizations (or if the number of organizations in the cluster is lower than 10, then highlight a policy that is used in more than two organizations)—$AV_{P_i}^{cluster_j}$ and $AS_{P_i}^{cluster_j}$. The indicated thresholds are exemplary and optionally configurable by a user.

Thereafter, the percentages of organizations that share each policy are used as an indicator of importance of the respective policy. If there are multiple policies that passed the threshold, then the policies are ranked based on the indicator of importance. The directionality of the policy is then normalized by analyzing the combination type and action.

The exemplary policies of FIGS. 6 and 8 are represented, as follows:

Authenticate—list all of the users and corresponding IP addresses that can access the system, specify a NEGATIVE combination type and set action to AUTHENTICATE; or Allow—list all of the users and corresponding IP addresses that can access the system set action to ALLOW and create another policy (with a lower priority) that will authenticate the rest of the users.

For each policy, a most common directionality is suggested with the selected values and sensors. Each organization that will share a given policy is optionally provided with the reasoning that will help the organizations to understand why the policy was chosen (e.g., without compromising the identities of contributing organizations).

FIG. 11 illustrates exemplary pseudo code 1100 for a policy validation process, according to one embodiment of the disclosure. As shown in FIG. 11, the exemplary policy validation process initially reverses the abstracted values and sensors to actual organization values (e.g., except those and sensors that contain list of active directory attributes), as follows:

$AV_{P_i}^{cluster_j} \rightarrow V_{P_i}^{customer_{ji}}$ and $AS_{P_i}^{cluster_j} \rightarrow S_{P_i}^{customer_{ji}}$.

Thereafter, the exemplary policy validation process applies the policy on the organization data and estimates the number of authentication/false positives that the suggested policy will trigger, for example, based on historical records and/or logs. Generally, this number is an approximation of the worst-case performance, since organizations can fine tune the suggested policy for their own needs.

In some embodiments, following execution of the policy sharing process of FIG. 10 and the policy validation process of FIG. 11, the organizations in a given cluster will know what policies were suggested to the community and will also have an approximation (e.g., a rough estimate) of possible values (based on their own data) and expected worst case performance.

The policy sharing process of FIG. 10 and/or the policy validation process of FIG. 11 are optionally executed on a periodic or semi-regular time period (e.g., weekly or according to another time frame), for example, to keep organizations updated with recent trends and/or techniques for mitigating new anomaly threats.

In some embodiments, the disclosed techniques for community-based anomaly detection policy sharing allow organizations to obtain one or more anomaly detection policies that have worked successfully by other similar organizations. In addition, the disclosed community-based anomaly detection policy sharing techniques allow organizations to benefit from the experience of other organizations with respect to new anomaly threats and to leverage new and/or modified policies deployed by similar organizations (for example, that may include new configurations, protocols and/or authentication methods).

Among other benefits, in one or more embodiments, the disclosed community-based anomaly detection policy sharing techniques automate and scale a sharing of best security practices among organizations. By accepting or rejecting the shared policies 190, organizations contribute to the community and can affect the outcomes of a given feature (for example, if a policy was initially implemented by 15% of organizations in a cluster but after two weeks more organizations decided to implement the policy, this provides an improved indicator of importance). In addition, organizations without a fraud detection team or another security team, can benefit from the best practices of similar organizations.

One or more embodiments of the disclosure provide improved methods, apparatus and computer program products for community-based anomaly detection policy sharing among organizations. The foregoing applications and associated embodiments should be considered as illustrative only, and numerous other embodiments can be configured using the techniques disclosed herein, in a wide variety of different applications.

It should also be understood that the disclosed community-based anomaly detection policy sharing techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for community-based anomaly detection policy sharing among organizations may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based community-based policy sharing system 100, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based community-based policy sharing platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 12 and 13. These platforms may also be used to implement at least portions of other information processing systems in other embodiments.

Figure 12:
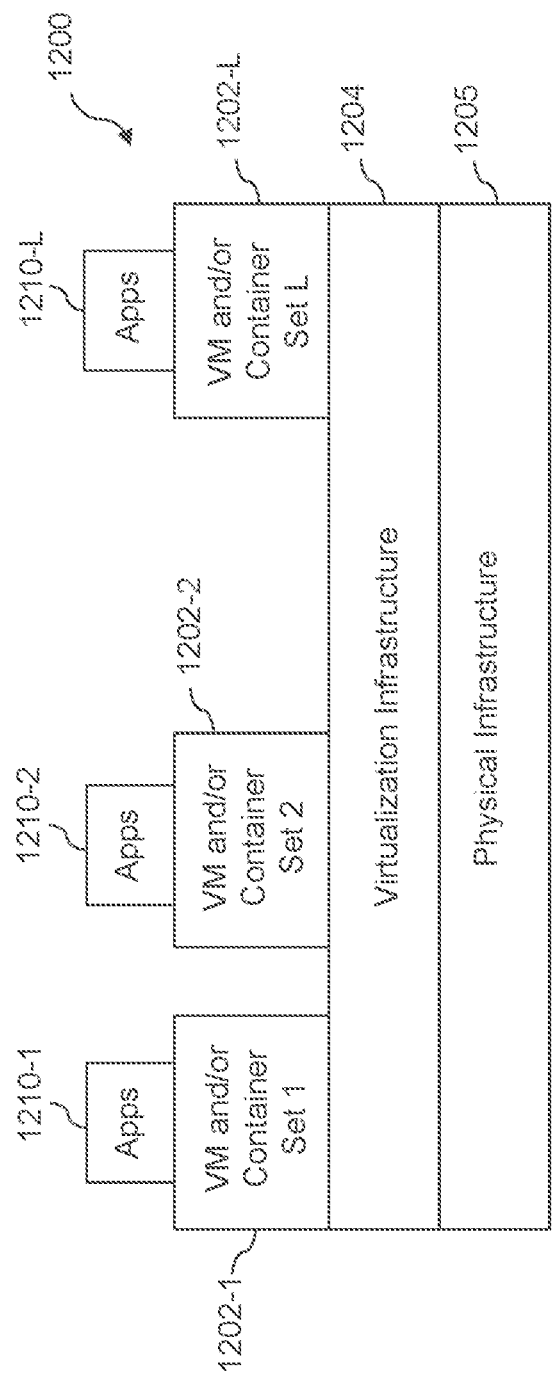
FIG. 12 illustrates an exemplary processing platform that may be used to implement at least a portion of one or more embodiments of the disclosure comprising a cloud infrastructure.

FIG. 12 shows an example processing platform comprising cloud infrastructure 1200. The cloud infrastructure 1200 comprises a combination of physical and virtual processing resources that may be utilized to implement at least a portion of the community-based policy sharing system 100. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. Such implementations can provide community-based anomaly detection policy sharing functionality of the type described above for one or more processes running on a given one of the VMs. For example, each of the VMs can implement community-based anomaly detection policy sharing control logic and associated community-based anomaly detection policy sharing functionality for one or more processes running on that particular VM.

An example of a hypervisor platform that may be used to implement a hypervisor within the virtualization infrastructure 1204 is the VMware® vSphere® which may have an associated virtual infrastructure management system such as the VMware® vCenter™. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system. Such implementations can provide community-based anomaly detection policy sharing functionality of the type described above for one or more processes running on different ones of the containers. For example, a container host device supporting multiple containers of one or more container sets can implement one or more instances of community-based anomaly detection policy sharing control logic and associated community-based anomaly detection policy sharing functionality.

As is apparent from the above, one or more of the processing modules or other components of community-based policy sharing system 100 may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises at least a portion of the given system and includes a plurality of processing devices, denoted 1302-1, 1302-2, 1302-3, . . . 1302-K, which communicate with one another over a network 1304. The network 1304 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1302-1 in the processing platform 1300 comprises a processor 1310 coupled to a memory 1312. The processor 1310 may comprise a microprocessor, a microcontroller, an application specific integrated circuit (ASIC), a field programmable gate array (FPGA) or other type of processing circuitry, as well as portions or combinations of such circuitry elements, and the memory 1312, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and the given system may include additional or alternative processing platforms, as well as numerous distinct processing platforms in any combination, with each such platform comprising one or more computers, storage devices or other processing devices.

Figure 13:
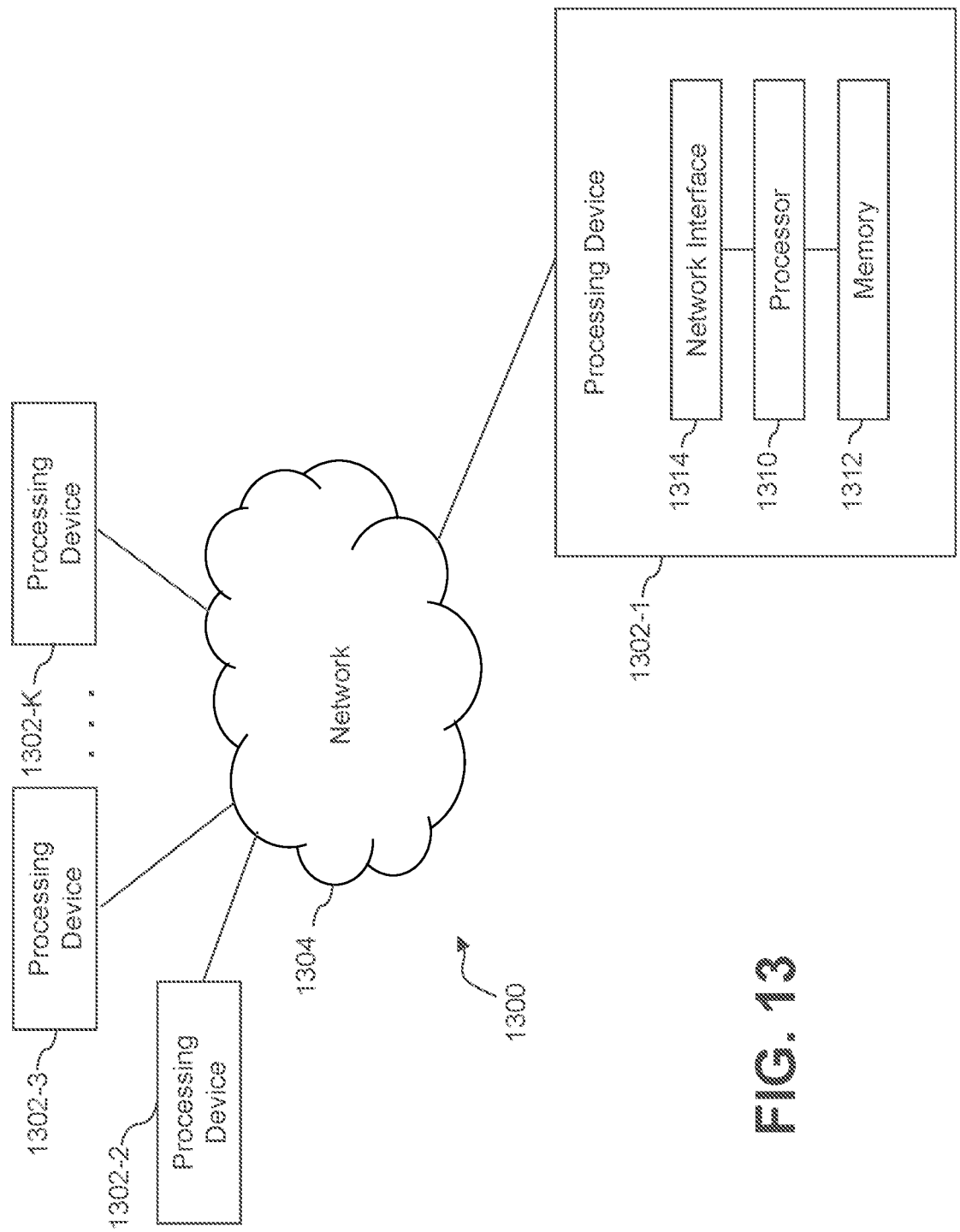
FIG. 13 illustrates another exemplary processing platform that may be used to implement at least a portion of one or more embodiments of the disclosure.

Multiple elements of an information processing system may be collectively implemented on a common processing platform of the type shown in FIG. 12 or 13, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining a first cluster, of a plurality of clusters, comprised of a plurality of first organizations derived from clustering a plurality of organizations based on one or more predefined clustering parameters;
   obtaining a plurality of policies from at least one of the plurality of first organizations in the first cluster;
   selecting, using at least one processing device, at least one of the obtained plurality of policies based at least in part on one or more of: (i) a percentage and (ii) a total number of first organizations in the first cluster that employ the at least one selected policy; and
   sharing the at least one selected policy with one or more of the first organizations in the first cluster, wherein the total number of first organizations in the first cluster that employ the at least one selected policy is determined prior to the sharing;
   wherein the method is performed by at least one processing device comprising a processor coupled to a memory.

2. The method of claim 1, further comprising simulating a use of the at least one selected policy by one or more of the plurality of organizations to evaluate a performance of the at least one selected policy.

3. The method of claim 1, further comprising normalizing the at least one selected policy prior to the sharing step.

4. The method of claim 1, further comprising abstracting the at least one selected policy prior to the sharing step.

5. The method of claim 1, wherein the predefined clustering parameters comprise one or more of an industry type, a number of users, a number of locations, a number of protected applications, an application type, a customer characterization and an overall security score.

6. The method of claim 1, further comprising ranking the at least one selected policy based at least in part on the percentage of first organizations that share each of the plurality of policies as an indicator of importance.

7. The method of claim 1, further comprising weighting a given policy obtained from the plurality of first organizations in the first cluster based on an influence rating of one or more source organizations that provided the given policy.

8. The method of claim 1, further comprising determining whether to share the at least one selected policy to each of the first organizations that did not employ the at least one selected policy prior to the sharing.

9. A system, comprising:
a memory; and
at least one processing device, coupled to the memory, operative to implement the following steps:
obtaining a first cluster, of a plurality of clusters, comprised of a plurality of first organizations derived from clustering a plurality of organizations based on one or more predefined clustering parameters;
obtaining a plurality of policies from at least one of the plurality of first organizations in the first cluster;
selecting, using at least one processing device, at least one of the obtained plurality of policies based at least in part on one or more of: (i) a percentage and (ii) a total number of first organizations in the first cluster that employ the at least one selected policy; and
sharing the at least one selected policy with one or more of the first organizations in the first cluster, wherein the total number of first organizations in the first cluster that employ the at least one selected policy is determined prior to the sharing.

10. The system of claim 9, further comprising the step of simulating a use of the at least one selected policy by one or more of the plurality of organizations to evaluate a performance of the at least one selected policy.

11. The system of claim 9, further comprising the step of one or more of normalizing and abstracting the at least one selected policy prior to the sharing step.

12. The system of claim 9, wherein the predefined clustering parameters comprise one or more of an industry type, a number of users, a number of locations, a number of protected applications, an application type, a customer characterization and an overall security score.

13. The system of claim 9, further comprising the step of ranking the at least one selected policy based at least in part on the percentage of first organizations that share each of the plurality of policies as an indicator of importance.

14. The system of claim 9, further comprising the step of weighting a given policy obtained from the plurality of first organizations in the first cluster based on an influence rating of one or more source organizations that provided the given policy.

15. A computer program product, comprising a non-transitory machine-readable storage medium having encoded therein executable code of one or more software programs, wherein the one or more software programs when executed by at least one processing device perform the following steps:
obtaining a first cluster, of a plurality of clusters, comprised of a plurality of first organizations derived from clustering a plurality of organizations based on one or more predefined clustering parameters;
obtaining a plurality of policies from at least one of the plurality of first organizations in the first cluster;
selecting, using at least one processing device, at least one of the obtained plurality of policies based at least in part on one or more of: (i) a percentage and (ii) a total number of first organizations in the first cluster that employ the at least one selected policy; and
sharing the at least one selected policy with one or more of the first organizations in the first cluster, wherein the total number of first organizations in the first cluster that employ the at least one selected policy is determined prior to the sharing.

16. The computer program product of claim 15, further comprising the step of simulating a use of the at least one selected policy by one or more of the plurality of organizations to evaluate a performance of the at least one selected policy.

17. The computer program product of claim 15, further comprising the step of one or more of normalizing and abstracting the at least one selected policy prior to the sharing step.

18. The computer program product of claim 15, wherein the predefined clustering parameters comprise one or more of an industry type, a number of users, a number of locations, a number of protected applications, an application type, a customer characterization and an overall security score.

19. The computer program product of claim 15, further comprising the step of ranking the at least one selected policy based at least in part on the percentage of first organizations that share each of the plurality of policies as an indicator of importance.

20. The computer program product of claim 15, further comprising the step of weighting a given policy obtained from the plurality of first organizations in the first cluster based on an influence rating of one or more source organizations that provided the given policy.

* * * * *